United States Patent

Sadogierski et al.

[15] 3,651,446
[45] Mar. 21, 1972

[54] PANEL MOUNTING APPARATUS

[72] Inventors: Walter C. Sadogierski, Park Ridge; William W. Wright, Wheaton, both of Ill.

[73] Assignee: Guardian Electric Manufacturing Company, Chicago, Ill.

[22] Filed: Nov. 12, 1969

[21] Appl. No.: 875,855

[52] U.S. Cl. .................................. 339/91 R, 339/126 R
[51] Int. Cl. ........................................................ H01r 13/54
[58] Field of Search .............. 339/128, 126, 91, 125, 127; 248/27

[56] References Cited

UNITED STATES PATENTS

| | | | |
|---|---|---|---|
| 2,891,103 | 6/1959 | Swengel | 174/153 |
| 3,273,104 | 9/1966 | Krol | 339/128 |
| 3,285,548 | 11/1966 | Matto et al. | 339/128 X |
| 3,366,729 | 1/1968 | Pauza | 174/138 |
| 3,475,718 | 10/1969 | Harty et al. | 339/128 X |

*Primary Examiner*—Richard E. Moore
*Attorney*—Molinare, Allegretti, Newitt & Witcoff

[57] ABSTRACT

An adapter for mounting an electric socket or the like in a panel board. The adapter is shaped to receive and hold the socket. Spaced lugs extend outwardly from opposite sides of the adapter and engage the rear side of the panel. First and second flanges also extend outwardly from the adapter adjacent the lugs for holding the appliance against the front side of the panel. The flanges are fastened to the adapter by resilient, outwardly biased segments that hold the flanges in engagement with the front side of the panel. The biased segments may be releasably moved toward the adapter to install or remove the adapter from the panel board thereby allowing the socket to be wired prior to the time it is mounted in the panel board.

2 Claims, 7 Drawing Figures

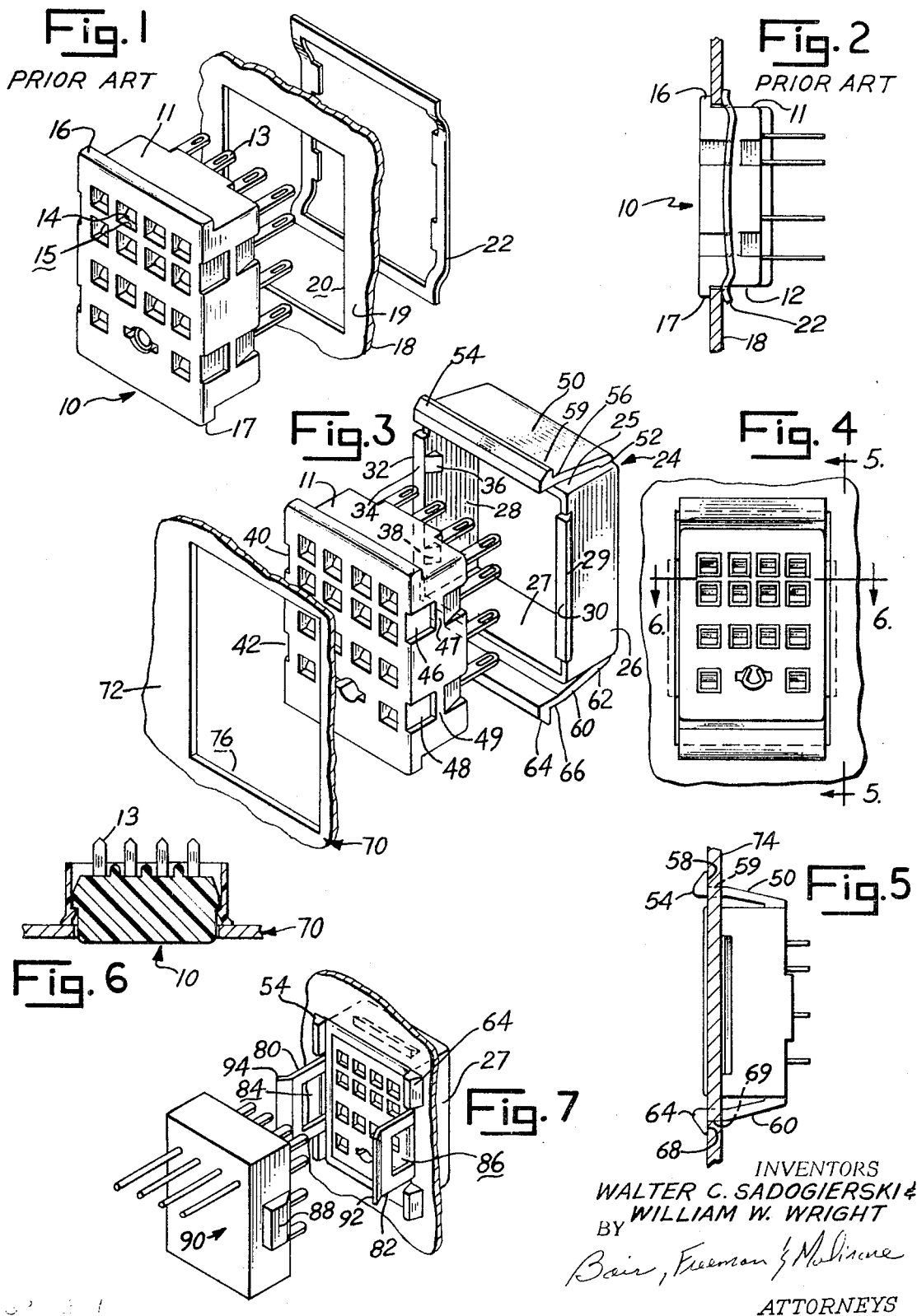

PANEL MOUNTING APPARATUS

BACKGROUND OF THE INVENTION

This invention basically relates to panel mounting apparatus, and more specifically relates to apparatus for mounting a prewired electrical appliance, such as a socket, through the rear side of a panel.

Those familiar with the electronics industry realize that modern electrical devices sometimes incorporate thousands of components that must be interconnected and wired together. One method of interconnecting such components involves the use of electrical appliances, such as sockets, that are mounted through holes in a panel. One typical kind of socket employs a group of openings that contain electrical conducting strips adapted to receive metal pins therein. The conducting strips, in turn, are connected to electrical terminals at the rear of the sockets that are generally soldered to electrical lead wires.

In the past, such sockets have been installed from the front of the mounting panel through corresponding holes, and have been held to the rear side of the panel by a resilient clip that is fitted over the socket after it is installed. The socket is held to the front side of the panel by flared portions that are integrally formed with the socket. Since such a socket can only be installed from the front side of the panel, the electrical terminals can not be conveniently connected to wires coming from the rear side of the panel until the socket is installed or is at least held in close proximity to the panel. This requirement has caused considerable delay and inconvenience in the wiring process and has resulted in considerable waste of manpower, as well as increased production costs.

Accordingly, it is the primary object of the present invention to provide improved panel mounting apparatus whereby an electrical appliance, such as a socket, may be mounted from the rear side of the panel after it has been wired.

Another object of the present invention is to provide improved panel mounting apparatus that allows an electrical appliance, such as a socket, to be wired prior to the time it is mounted in a panel.

Yet another object of the present invention is to provide improved panel mounting apparatus that allows the appliance to be easily removed from either the front or rear side of a panel.

Yet another object of the present invention is to provide improved panel mounting apparatus whereby an electrical appliance, such as a socket, may be installed in the panel without the use of tools.

SUMMARY OF THE INVENTION

In order to overcome the deficiencies of the prior art, and to achieve the foregoing objects, the present invention basically comprises improved apparatus for mounting an electrical appliance in a panel having a front side and a rear side that defines a hole adapted to receive the appliance. In principal aspect, the improved apparatus comprises lug means operatively connected to the appliance for holding the appliance against the rear side of the panel; first and second lip means for holding the appliance against the front side of the panel; and resilient means connected between the lip means and the appliance so that the lip means are normally held in engagement with the front side of the panel. Moreover, by moving the resilient means in an appropriate manner, the lip means may be releasably moved toward the appliance in order to clear the holes as the appliance is installed from the rear side of the panel.

The advantage achieved by use of the above-described apparatus are at once apparent. By mounting the lip means on a resilient means, the appliance may be installed either from the front or the rear of the panel so that the appliance may be wired prior to the time it is mounted. This mode of operation enables each appliance to be wired on an assembly line basis and to be later installed in a panel according to a predetermined layout design. As a result, the apparatus allows the use of a mode of operation that drastically reduces production costs and provides means of mounting appliances in panels with a degree of ease and convenience heretofore unattained.

Another aspect of the invention relates to the use of brackets mounted on the apparatus in order to conveniently hold a male plug member in contact with the appliance.

DESCRIPTION OF THE DRAWING

These and additional objects, advantages, and features of the present invention will hereinafter appear for purposes of illustration, but not of limitation, in connection with the accompanying drawing, wherein like numbers refer to like parts throughout, and wherein:

FIG. 1 is a perspective view of a prior art means of mounting an electrical appliance in a panel;

FIG. 2 is a side elevational, partially cross-sectional view of the prior art panel mounting apparatus shown in FIG. 1 in its mounted position;

FIG. 3 is a perspective, exploded view of a preferred form of panel mounting apparatus made in accordance with the present invention shown in connection with an exemplary electrical appliance and panel therefor;

FIG. 4 is a partially fragmentary, front elevational view of the panel mounting apparatus shown in FIG. 3 as it appears in its mounted position;

FIG. 5 is a side elevational, partially cross-sectional view taken along line 5—5 in FIG. 4;

FIG. 6 is a cross-sectional view taken along line 6—6 in FIG. 4; and

FIG. 7 is a perspective, partially fragmentary view of a modified form of panel mounting apparatus made in accordance with the present invention wherein mounting brackets are used in connection therewith.

DESCRIPTION OF THE PREFERRED EMBODIMENTS

FIGS. 1 and 2 illustrate the manner in which a prior art electrical appliance, such as socket 10, is mounted to a panel 18 having a hole 20. As shown in FIG. 2, hole 20 is made just big enough to fit flushly against surfaces 11 and 12 of socket 10.

Socket 10 comprises terminals 13 that are electrically connected to conductors 14 inside openings 15. As previously mentioned, the openings are adapted to receive pins of analogous electrical connecting apparatus. Socket 10 also comprises flared portions 16 and 17 that are adapted to engage the front side 19 of panel 18. In order to assembly socket 10 with panel 18, terminals 13 are moved through hole 20 until flared portions 16 and 17 engage the front side of the panel. Then a resilient metal clip 22 is fastened to the socket as shown in FIG. 2.

As previously discussed, the type of panel mounting apparatus shown in FIGS. 1 and 2 requires that the socket be mounted in the panel (or at least held adjacent the panel) prior to the time that terminals 13 are wired. This procedure results in considerable inefficiency and significantly increases the cost of wiring the electrical device of which socket 10 forms a part.

The preferred embodiment of the present invention is illustrated in FIGS. 3–6, and may be used in connection with a prior art socket 10, such as the one shown in FIG. 1. As shown in FIGS. 3–6, the preferred embodiment preferably comprises an adapter 24 having side walls 25, 26, 27 and 28. Side wall 26 bears an exterior lug 29 having an engaging face 30, and side wall 28 bears an analogous exterior lug 32 having an engaging face 34. Side wall 28 also bears interior clamps 36 and 38 that are adapted to engage recesses 40 and 42, respectively, in socket 10. Two analogous interior clamps are connected to side wall 26 and are adapted to engage recesses 46 and 48. As shown in FIG. 3, recesses 46 and 48 have raised sections 47 and 49, respectively, in the middle thereof that are adapted to engage the interior clamps connected to side wall 26. Recesses 40 and 42 have analogous raised sections that are adapted to engage interior clamps 36 and 38.

An upper resilient member 50 is connected to side wall 25 at end point 52, and bears a lip member 54 at end point 56. Lip member 54 has a face 58 and side surface 59 that are adapted to engage the panel in a manner described hereafter.

A lower resilient member 60 is connected to side wall 27 at end point 62, and bears a lip member 64 at end point 66. Lip member 64 has a face 68 and side surface 69 that engage the panel in a manner described hereafter.

As shown in FIGS. 3–6, the panel mounting apparatus described herein is used to releasably mount socket 10 in a panel 70 having a front side 72, a rear side 74 and a hole 76. In order to achieve this goal, adapter 24 is moved over surfaces 11 and 12 of socket 10 until the interior clamps thereof "snap over" the raised sections that divide the recesses located on socket 10. Of course, side walls 26 and 28 must be flexible enough to accomplish this purpose. When the adapter and socket are assembled in the described manner, the clamps prevent the socket from moving toward the front of the adapter, and flared portions 16 and 17, which engage side walls 25 and 27, prevent the socket from moving toward the rear of the adapter. When the socket and adapter have been assembled in the described manner, terminals 13 may be soldered to appropriate wires even though socket 10 is not mounted in panel 70.

After the wiring is completed, the adapter-socket assembly combination may be inserted in hole 76 from the rear side of the panel by merely flexing resilient members 50 and 60 toward the socket so that lip members 54 and 64 fit through the hole. It should be noted that hole 76 is somewhat larger than hole 20 described in connection with FIG. 1. Basically hole 76 is made slightly larger than the size required in order to accommodate flared portions 16 and 17 so that lip members 54 and 64 will conveniently fit through the hole when the resilient members are flexed.

Socket 10 is pushed through the hole until engaging faces 30 and 34 rest against the rear side of the panel. The upper and lower resilient members are then released so that lip members 54 and 64 are urged into the positions shown in FIGS. 4 and 5. As a result, faces 58 and 68 of lip members 54 and 64, respectively, engage the front side of the panel and side surfaces 59 and 69 engage the sides of opening 76 so that socket 10 is securely held in place. The surfaces 58 and 68 are thus spaced from the surfaces 30 and 34 in a direction normal to the panel 70 by a distance approximately equal to the thickness of the panel 70.

The socket and adapter may be conveniently removed by again flexing resilient members 50 and 60 toward the socket so that the lip members fit through hole 76 as, for example, shown in FIG. 7. The resilient members 50 and 60, as well as the adapter, may be made from many convenient materials, such as plastic. Of course, the resilient members 50 and 60 and lugs 29 and 32 may be formed as an integral part of socket 10, if desired. Thus, the socket 10 and adapter 24 may be made from one piece of material so that an integral socket-adapter will fit in a panel as, for example, panel 74 in FIG. 5.

An alternative embodiment of the present invention is illustrated in FIG. 7. As shown therein, resilient members 50 and 60 are divided into two parts that are arranged on either side of bracket 80 and 82, respectively. Bracket 80 is connected as an integral part of side wall 25 and bracket 82 is connected as an integral part of side wall 27. Bracket 82 defines a cutout portion 86 that is adapted to receive a cam 88 of a male plug member 90. Bracket 82 also comprises an outwardly flaring flange member 92 that aids in the process of receiving cam 88. Bracket 80 comprises a cutout portion 84 and an outwardly flaring flange member 94 that receive a cam corresponding to cam 88. When the cams are engaged in the cutout portions, plug member 90 is securely held to socket 10.

What is claimed is:

1. An improved adapter and a separate electric socket, the adapter and socket being mounted in a panel opening of a panel, said panel having a front side and a back side, said separate electric socket of the type including four side surfaces, a front surface and a back surface, said side surfaces including fixed flanges to engage one side of a panel, said side surfaces also including lugs to engage separate fastening means on the opposite side of a panel to thereby hold said separate socket in a panel, said socket also including lead wire terminals extending from said back surface, said adapter being fabricated from a resilient material and being engaged against the side surfaces of said socket, said adapter also being engaged with said panel through said panel opening and comprising, in combination:

a frame which is fitted about the circumference of said socket, said circumference being defined by said side surfaces, said frame having interior locking and clamp means positioned to engage said socket lugs, said socket flanges being in engagement with a portion of said frame effectively locking said socket in said frame, said frame also including external lug means in engagement with said back side of said panel, and said frame also including flexible grasping and holding members in engagement with said front side of said panel for holding said external lug means and thus said frame in fixed position in said panel opening.

2. An improved adapter and a separate electric socket, the adapter and socket being mounted in a panel opening of a panel, said panel having a front side and a back side, said separate electric socket of the type including four side surfaces, a front surface and a back surface, said side surfaces including fixed flanges to engage one side of a panel, said side surfaces also including lugs to engage separate fastening means on the opposite side of a panel to thereby hold said separate socket in a panel, said socket also including lead wire terminals extending from said back surface, said adapter being fabricated from a resilient material and being engaged against the side surfaces of said socket, said adapter also being engaged with said panel through said panel opening and comprising, in combination:

a frame which is fitted about the circumference of said socket, said circumference being defined by said side surfaces, said frame having interior locking and clamp means positioned to engage said socket lugs, said socket flanges being in engagement with a portion of said frame effectively locking said socket in said frame, said frame also including external lug means in engagement with said back side of said panel, said frame also including flexible grasping and holding members in engagement with said front side of said panel for holding said external lug means and thus said frame in fixed position in said panel opening, and second grasping members extending from said frame for grasping a second socket member and maintaining said second socket member in fixed position relative to said first socket member and said panel.

* * * * *